(12) United States Patent
Jurik et al.

(10) Patent No.: US 12,480,651 B2
(45) Date of Patent: *Nov. 25, 2025

(54) SYSTEM AND METHOD FOR CONTROLLING THE HUMIDITY AND PRESSURE IN A LUMINAIRE

(71) Applicant: ROBE lighting s.r.o., Roznov pod Radhostem (CZ)

(72) Inventors: Pavel Jurik, Prostredni Becva (CZ); Josef Valchar, Prostredni Becva (CZ)

(73) Assignee: ROBE lighting s.r.o., Roznov pod Radhostem (CZ)

( * ) Notice: Subject to any disclaimer, the term of this patent is extended or adjusted under 35 U.S.C. 154(b) by 256 days.

This patent is subject to a terminal disclaimer.

(21) Appl. No.: 18/093,617

(22) Filed: Jan. 5, 2023

(65) Prior Publication Data
US 2023/0414531 A1 Dec. 28, 2023

Related U.S. Application Data

(63) Continuation of application No. 17/851,742, filed on Jun. 28, 2022, now Pat. No. 11,549,679.

(51) Int. Cl.
*F21V 31/03* (2006.01)
*A61K 39/00* (2006.01)
(Continued)

(52) U.S. Cl.
CPC .......... *F21V 31/03* (2013.01); *A61K 39/0008* (2013.01); *A61K 39/35* (2013.01);
(Continued)

(58) Field of Classification Search
CPC ........ F21V 31/03; F21V 31/005; F21V 21/28; F21V 21/29; F21V 21/30; F21V 29/90; F21V 33/0088; F21V 33/0092
See application file for complete search history.

(56) References Cited

U.S. PATENT DOCUMENTS

| 4,405,974 A | 9/1983 | Quiogue |
| 4,701,833 A | 10/1987 | Bornhorst |

(Continued)

FOREIGN PATENT DOCUMENTS

| CN | 106907684 A | 6/2017 |
| CN | 109357206 A | 2/2019 |

(Continued)

OTHER PUBLICATIONS

Jurik, Pavel, et al.; U.S. Appl. No. 17/901,231, filed Sep. 1, 2022; Title: System and Method for Controlling the Humidity and Pressure in a Luminaire; 34 pages.

(Continued)

*Primary Examiner* — Zheng Song
(74) *Attorney, Agent, or Firm* — Conley Rose, P.C.; Brooks W Taylor

(57) ABSTRACT

A luminaire is provided, having an enclosure and a chamber air coupled to the enclosure. The enclosure includes luminaire components that emit a light beam, has an opening, and is otherwise sealed. The chamber includes a drying agent, two openings, and is otherwise sealed from the external air. One opening of the chamber is coupled by a sealed air coupling to the opening of the enclosure. The other opening of the chamber is completely covered by a membrane that allows air to pass through the material while reducing the passage of water droplets in the air. The enclosure may include sensors that measure air pressure, air humidity, and/or air temperature of the enclosure. The luminaire may include a control system configured to collect data from the sensors and to send information related to the collected data to a user of the luminaire via a communication channel.

20 Claims, 6 Drawing Sheets

(51) Int. Cl.
  *A61K 39/35* (2006.01)
  *A61P 37/02* (2006.01)
  *F21V 29/90* (2015.01)
  *F21V 31/00* (2006.01)
  *A61K 9/70* (2006.01)
  *A61K 31/4188* (2006.01)
  *A61K 31/437* (2006.01)
  *A61K 47/10* (2017.01)
  *F21V 23/00* (2015.01)

(52) U.S. Cl.
  CPC .............. *A61P 37/02* (2018.01); *F21V 29/90* (2015.01); *F21V 31/005* (2013.01); *A61K 9/7092* (2013.01); *A61K 31/4188* (2013.01); *A61K 31/437* (2013.01); *A61K 47/10* (2013.01); *F21V 23/001* (2013.01)

(56) References Cited

U.S. PATENT DOCUMENTS

| | | | |
|---|---|---|---|
| 6,709,493 B2* | 3/2004 | DeGuiseppi | F21S 45/33 96/7 |
| 9,777,917 B2 | 10/2017 | Johansen | |
| 11,137,130 B1 | 10/2021 | Dry et al. | |
| 11,549,679 B2* | 1/2023 | Jurik | F21V 31/005 |
| 12,085,267 B2* | 9/2024 | Jurik | F21V 14/006 |
| 2017/0184288 A1 | 6/2017 | Owens et al. | |
| 2022/0325883 A1 | 10/2022 | Jurik et al. | |

FOREIGN PATENT DOCUMENTS

| | | |
|---|---|---|
| CN | 110657366 A | 1/2020 |
| CN | 211526189 U | 9/2020 |
| CN | 212081085 U | 12/2020 |
| CN | 113339745 A | 9/2021 |
| CN | 113464870 A | 10/2021 |
| DE | 102006028295 A1 | 12/2007 |
| KR | 100948151 B1 | 3/2010 |
| WO | WO-9727042 A1 * | 7/1997 ............ B01J 20/043 |
| WO | 0047932 A1 | 8/2000 |
| WO | 2016201045 A1 | 12/2016 |
| WO | 2020201255 A1 | 10/2020 |

OTHER PUBLICATIONS

Jurik, Pavel, et al.; U.S. Appl. No. 18/045,363, filed Oct. 10, 2022; Title: System and Method for Controlling the Humidity and Pressure in a Luminaire; 41 pages.

Gore; "Gore Protective Vents for Lighting Enclosures"; https://www.gore.com/products/gore-protective-vents-for-lighting-enclosures; Retrieved Jun. 1, 2022; 7 pages.

Gore; "Resource Library"; https://www.gore.com/resources/search?f[]=product:66&f[]=content_type:21&f[]=language:en; Retrieved May 25, 2022; 2 pages.

Notice of Allowance issued Sep. 14, 2022; U.S. Appl. No. 17/851,742, filed Jun. 28, 2022; 14 pages.

European Extended Search Report; Application No. 22200965.6; Jun. 12, 2023; 5 pages.

European Extended Search Report; Application No. 22201083.7; May 31, 2023; 8 pages.

Notice of Allowance dated May 1, 2024; U.S. Appl. No. 18/045,363, filed Oct. 10, 2022; 8 pages.

Jurik, Pavel, et al.; U.S. Appl. No. 18/807,568, filed Aug. 16, 2024; Title: System and Method for Controlling the Humidity and Pressure in a Luminaire; 38 pages.

European Examination Report; Application No. 22201083.7; Aug. 21, 2024; 4 pages.

Office Action dated Nov. 24, 2023; U.S. Appl. No. 18/045,363, filed Oct. 10, 2022; 29 pages.

European Extended Search Report; Application No. 24215269.2; Feb. 17, 2025; 10 pages.

European Extended Search Report; Application No. 25177139.0; Jul. 30, 2025; 10 pages.

* cited by examiner

SYSTEM AND METHOD FOR CONTROLLING THE HUMIDITY AND PRESSURE IN A LUMINAIRE

CROSS-REFERENCE TO RELATED APPLICATIONS

This application is a continuation of U.S. patent application Ser. No. 17/851,742 filed on Jun. 28, 2022 by Pavel Jurik, et al. and entitled, "System and Method for Controlling the Humidity and Pressure in a Luminaire," which is incorporated herein by reference in its entirety for all purposes.

TECHNICAL FIELD OF THE DISCLOSURE

The disclosure generally relates to luminaires, and more specifically to a method for controlling the humidity and pressure inside a luminaire.

BACKGROUND

Luminaires with automated and remotely controllable functionality (which may be referred to as automated luminaires) are well known in the entertainment and architectural lighting markets. Such products are commonly used in theatres, television studios, concerts, theme parks, night clubs, and other venues. A typical automated luminaire provides control from a remote location of the pan and tilt functions of the luminaire allowing an operator to control the direction the luminaire is pointing and thus the position of the light beam on the stage or in the studio. Many automated luminaires additionally or alternatively provide control from the remote location of other parameters such as intensity, focus, zoom, beam size, beam shape, and/or beam pattern of light beam(s) emitted from the luminaire. Such automated luminaire products are often used outdoors in, for example, theme parks or concerts. Maintaining a dry, controlled physical environment inside an automated luminaire is important for the continuing operation of the unit.

BRIEF DESCRIPTION OF THE DRAWINGS

For a more complete understanding of this disclosure, reference is now made to the following brief description, taken in conjunction with the accompanying drawings in which like reference numerals indicate like features.

SUMMARY

Figure 1:
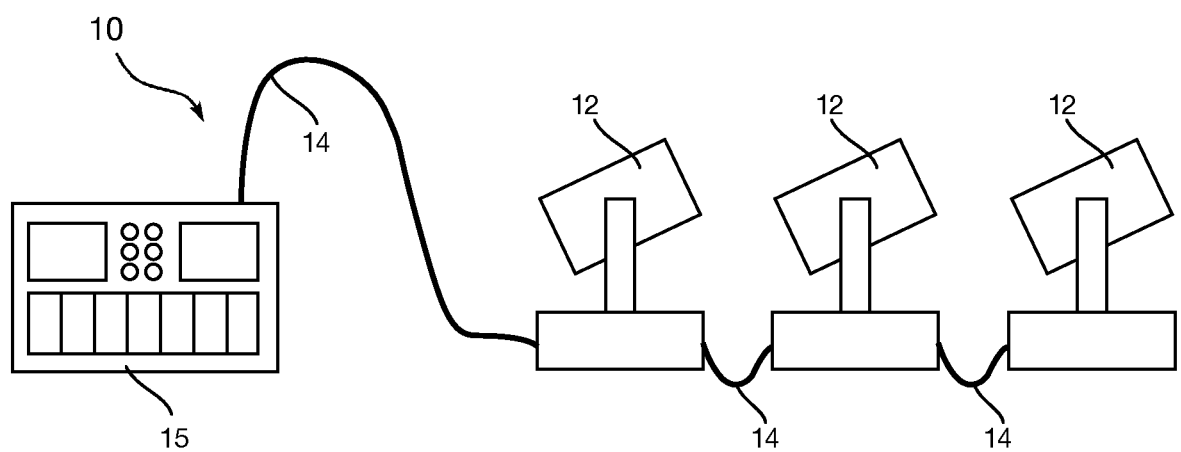
FIG. 1 presents a schematic view of a luminaire system according to the disclosure.

In a first embodiment, a luminaire includes an enclosure and a chamber air coupled to the enclosure. The enclosure includes one or more luminaire components that are configured to modify and emit a light beam. The enclosure also includes a first opening and is otherwise sealed from external air. The chamber includes a drying agent and second and third openings and is otherwise sealed from the external air. The chamber is coupled at the second opening by a sealed air coupling to the enclosure at the first opening. The third opening includes a membrane that completely covers the third opening. The membrane includes a material configured to allow air to pass through the material while reducing the passage of water droplets in the air.

The enclosure may further include one or more sensors that are configured to measure characteristics of the enclosure, where the characteristics include one or more of air pressure, air humidity, and/or air temperature. The luminaire may further include a control system electrically coupled to the one or more sensors. The control system may be configured to collect data from the one or more sensors and to send information related to the collected data to a user of the luminaire via a communication channel.

In a second embodiment, a luminaire includes a first enclosure, a second enclosure air coupled to the first enclosure, and a chamber air coupled to the first enclosure. The first enclosure includes one or more luminaire components that are configured to modify and emit a light beam. The first enclosure also includes first and second openings and is otherwise sealed from external air. The second enclosure includes electronic circuits electrically coupled to the luminaire components of the first enclosure. The second enclosure also includes a third opening and is otherwise sealed from the external air. The first enclosure is rotatably mounted to the second enclosure and the first opening is air coupled to the third opening by a rotatable sealed air coupling. The chamber includes a drying agent and fourth and fifth openings and is otherwise sealed from the external air. The chamber is coupled at the fourth opening by a sealed air coupling to the first enclosure at the second opening. The fifth opening comprises a membrane that completely covers the fifth opening. The membrane includes a material that is configured to allow air to pass through the material while reducing the passage of water droplets in the air.

At least one of the first enclosure and the second enclosure may include one or more sensors that are configured to measure characteristics of the at least one enclosure, where the characteristics include one or more of air pressure, air humidity, and/or air temperature. The luminaire may further include a control system electrically coupled to the one or more sensors. The control system may be configured to collect data from the one or more sensors and to send information related to the collected data to a user of the luminaire via a communication channel.

DETAILED DESCRIPTION

Preferred embodiments are illustrated in the figures, like numerals being used to refer to like and corresponding parts of the various drawings.

If a luminaire (or fixture) is used outdoors or in another area where it is subject to rain, weather, or high humidity it is important to protect any luminaire mechanisms and optical systems from the effects of moisture and humidity. Some fixtures may have sealed housings or semi-sealed housings with pressure equalization. Such fixtures may suffer from effects caused by the thermal operating cycle, as follows. When an automated luminaire is turned on, internal systems such as light sources, electronics, power supplies, and motors generate heat and cause the temperature inside the fixture to rise. Such a rise in temperature produces a corresponding increase in the air pressure within the luminaire.

In some fixtures, this pressure is contained within the luminaire using hermetic seals. The load on such a hermetic seal from such a pressure increase within the luminaire can be significant and the repair and maintenance of the seals may be expensive and/or difficult. A failure in such seals may lead to water ingress into the luminaire, which may lead to damage or degradation of the luminaire mechanisms and/or optical systems.

In other fixtures, the fixture is sealed, but the pressure is allowed to escape through pressure relief valves. However, when such a fixture is powered off and cools down, its internal pressure drops relative to atmospheric pressure outside the fixture and external air (or outside air) and moisture may be drawn back into the luminaire through the seals, the pressure relief valve, or other paths. This too can lead to water ingress to the luminaire or condensation within the luminaire and damage or degradation of the luminaire mechanisms and/or optical systems.

Luminaires according to the disclosure are sealed, but also are vented to the outside air through a system that removes excess humidity from incoming air and reduces condensation within the luminaire. This has the advantage of reducing water ingress to the luminaire and condensation within the luminaire, as well as reducing damage or degradation of the luminaire mechanisms and/or optical systems.

Luminaires according to the disclosure are also segmented into enclosures that are sealed and are coupled to each other to allow passage of air between the enclosures. The connected enclosures are vented to the outside air through each other to a single water and humidity reducing system. In such embodiments, the enclosures are coupled by air passages that are rotatably coupled to the enclosures, giving the advantage of allowing one or more of the enclosures to rotate relative to each other while reducing water ingress to the luminaire and condensation within the luminaire. Optical, mechanical, and electrical components of the luminaire may be located in various ones of the enclosures as appropriate to the design and functioning of the luminaire.

FIG. 1 presents a schematic view of a luminaire system 10 according to the disclosure. The luminaire system 10 includes a plurality of luminaires 12 according to the disclosure. The luminaires 12 each contains on-board a light source, one or more of color changing systems, light modulation devices, and pan and/or tilt systems to control an orientation of a head of the luminaire 12. Mechanical drive systems to control parameters of the luminaire 12 include motors or other suitable actuators coupled to a control system, as described in more detail with reference to FIG. 2, which is configured to control the motors or other actuators.

In addition to being connected to mains power either directly or through a power distribution system, the control system of each luminaire 12 is connected in series or in parallel by a wired data link 14 to one or more control desks 15. Upon actuation by an operator, the control desk 15 sends control signals (such as commands) via the data link 14, where the control signals are received by the control system of one or more of the luminaires 12. The control systems of the one or more of the luminaires 12 that receive the control signals may respond by changing one or more of the parameters of the receiving luminaires 12. The control signals are sent by the control desk 15 to the luminaires 12 using DMX-512, Art-Net, ACN (Architecture for Control Networks), Streaming ACN, or other suitable communication protocol.

The luminaire head of the luminaire 12 comprises an optical system comprising one or more luminaire mechanisms, each of which includes one or more optical devices such as gobo wheels, effects wheels, and color mixing (or other color changing) systems, as well as prism, iris, shutter, and lens movement systems. The term luminaire mechanisms further includes a pan and tilt mechanism configured to move the luminaire head relative to a fixed portion of the luminaire 12. Some or all of the luminaire mechanisms may include stepper motors or other rotating actuators to cause movement of their associated optical device(s).

Figure 2:
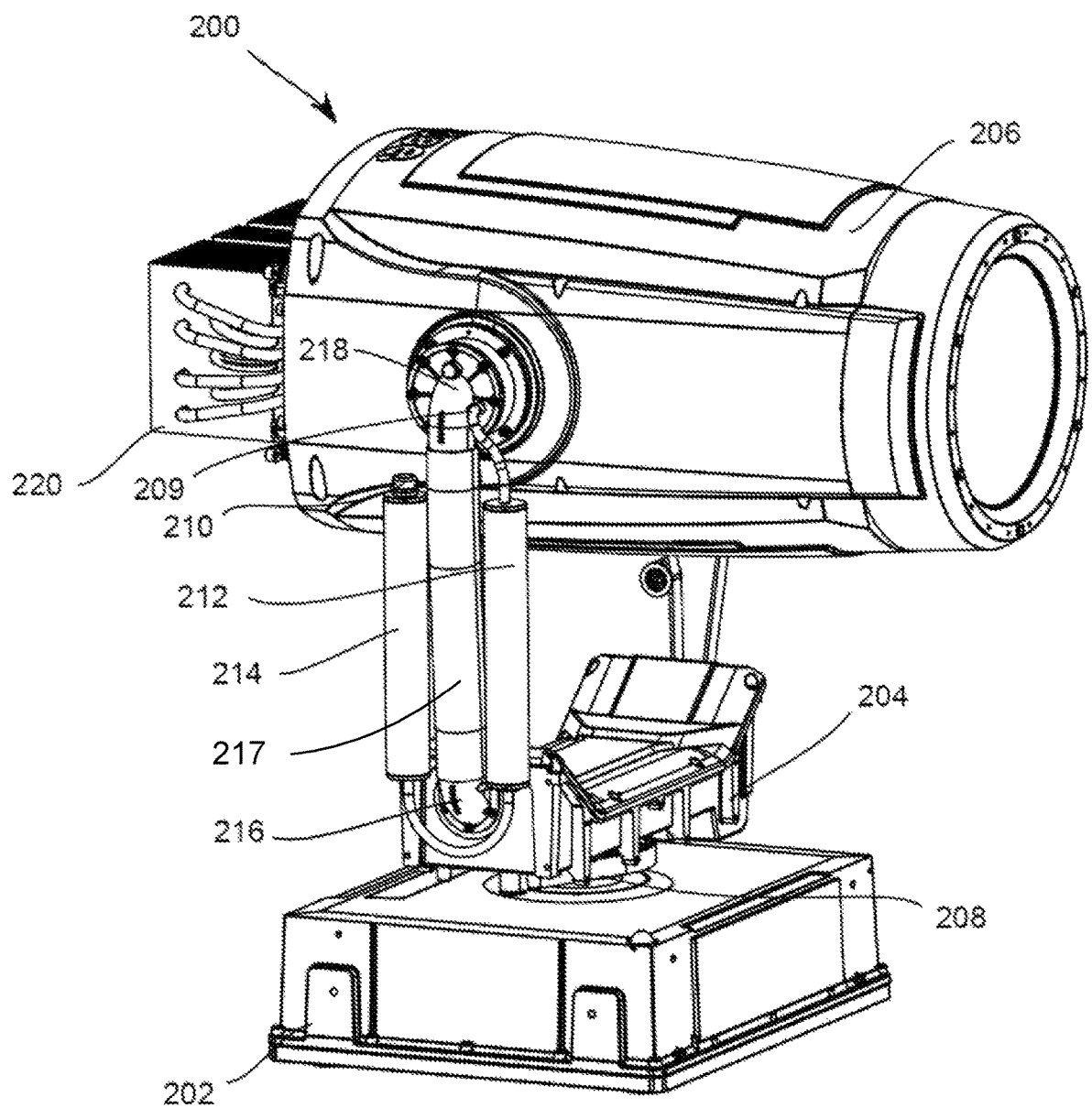
FIG. 2 presents a first view of a luminaire comprising a luminaire humidity and pressure control system according to the disclosure.

FIG. 2 presents a first view of a luminaire 200 comprising a luminaire humidity and pressure control system according to the disclosure. FIG. 2 shows the luminaire 200 with some components removed so that the humidity and pressure control system is more easily seen and described. The luminaire 200 may comprise a number of separate enclosures that can be protected by the humidity and pressure control system. The luminaire 200 includes a base enclosure 202, a motor enclosure 204, and a head enclosure 206. The base enclosure 202 is a portion of the luminaire that is typically fixedly attached to or rests on a supporting structure and remains stationary. The base enclosure 202 may include power supplies, interface electronics, and other control equipment. The motor enclosure 204 may include the motors and associated electronics that control pan and/or tilt motion of the luminaire head. The head enclosure 206 may include luminaire components such as optical devices and associated motors, as well as circuits and other control electronics. A light source 220 may be located within the head enclosure 206 or may be external to, but optically coupled with, the head enclosure 206, as described in more detail with reference to FIG. 4. The light source 220 and the luminaire components produce and modify a light beam that is emitted from the head enclosure 206. The head enclosure 206 moves in a tilt direction relative to the motor enclosure 204, the motor enclosure 204 moves in a pan direction relative to the base enclosure 202. Thus, the head enclosure 206 is rotatably mounted to the base enclosure 202 by the motor enclosure 204.

Although the luminaire 200 includes three enclosures, in other embodiments any number of enclosures may be included. For example, a light bar or cyclorama luminaire may have only the head enclosure 206 mounted for tilt motion relative to the base enclosure 202. The motors and associated electronics that control tilt motion of such a luminaire may be located in either or both of the base enclosure 202 and/or the head enclosure 206. Still other embodiments may include only a single enclosure or more than three enclosures. The ability to increase the number of enclosures in a luminaire according to the disclosure provides the advantage of increasing the number of luminaire components that may be protected from damage or degradation caused by water ingress and/or condensation, while also allowing the additional components to rotate relative to each other. It is to be understood that when the phrase 'connected enclosures' is used in this specification, it means one or more enclosures.

All three enclosures 202, 204, and 206 are sealed such that external air does not pass through the seals. However, the enclosures 202, 204, and 206 are connected together and vented through drying tubes 212 and 214 that allow air to flow into and out of the enclosures, such that an internal air pressure in the enclosures 202, 204, and 206 never rises significantly above or below an external atmospheric pressure, thereby reducing pressure on the seals of the enclosures. In the luminaire 200, the base enclosure 202 is vented to the motor enclosure 204 through a pipe 208 that couples an opening in the base enclosure 202 to an opening in the motor enclosure 204.

The pipe 208 provides a rotatable sealed air coupling between the base enclosure 202 to the motor enclosure 204. The coupling is an air coupling because it allows passage of air from the base enclosure 202 to the motor enclosure 204. The coupling is a sealed air coupling because it is sealed from the external air. The coupling is a rotatable sealed air coupling because it comprises rotating flanges, gaskets, seals, and/or other elements configured to allow the base enclosure 202 and the motor enclosure 204 to rotate relative to each other while still allowing the passage of air. A sealed air coupling that does not allow the pipe 208 to rotate relative to the base enclosure 202 or the motor enclosure 204 may be referred to as a fixed sealed air coupling. The pipe 208 provides a rotatable sealed air coupling that is configured to pass air from the base enclosure 202 to the motor enclosure 204, sealed from the external air, through the rotating pan system at the base of the motor enclosure 204 by which the motor enclosure 204 rotates relative to the base enclosure 202.

In turn, the motor enclosure 204 is vented to the head enclosure 206 through a pipe 217. The pipe 217 comprises a sealed air coupling at a first end 216 to an opening in the motor enclosure 204 and a rotating sealed air coupling at a second end 218 to an opening in the head enclosure 206. The pipe 217 is configured to pass air from the motor enclosure 204 to the head enclosure 206 through the rotating tilt system on the side of the head enclosure 206.

The three enclosures 202, 204, and 206 are thus connected together by pipes 208 and 217 to form a combined enclosure having pressure and humidity control. The combined enclosure is vented to the external air through a vent pipe 209 via an opening in the head enclosure 206. The vent pipe 209 comprises a rotating sealed air coupling at a first end to the opening in the head enclosure 206. The vent pipe 209 comprises a sealed air coupling at a second end to a drying tube (or chamber) 212, which is sealed air coupled to a drying tube 214. The drying tubes 212 and 214 include a drying agent such as silica gel or other suitable desiccant material. An exit opening of the drying tube 214 includes a membrane 210 that air couples the drying tube 214 to the surrounding atmosphere (the external air).

The membrane 210 may comprise a hydrophobic membrane material such as GORE-TEX (a registered trademark of W. L. Gore & Associates, Newark, Delaware) or other suitable material that allows air to pass through, but reduces or prevents the passage of water and/or moisture in the form of water droplets. Thus, the membrane 210 is configured to remove water droplets from incoming air and the drying agent of the drying tubes 212 and 214 is configured to remove water vapor (or humidity) from incoming air.

In operation, when the luminaire 200 is powered up, both the temperature and internal air pressure within the three enclosures 202, 204, and 206 rise. This increase in air pressure forces air out of the enclosures 202, 204, and 206 through the vent pipe 209 and drying tubes 212 and 214 before exiting the luminaire 200 at membrane 210. When the luminaire 200 is powered down, both the temperature and the internal air pressure inside the enclosures 202, 204, and 206 drop and external air may be drawn back into the luminaire 200 through the membrane 210, reducing or eliminating liquid water and/or moisture in the indrawn air. The indrawn air then passes through the drying tubes 212 and 214. The drying tubes 212 and 214 will remove water vapor from the indrawn air, causing the air that enters the enclosures 202, 204, and 206 through vent pipe 209 to have a reduced humidity. This forcing of air out of and subsequent drawing of air back into the enclosures 202, 204, and 206 may be referred to as an 'air cycle path' of the luminaire humidity and pressure control system of the disclosure.

Because the volume of air passing out of and into the enclosures 202, 204, and 206 through the drying tubes 212 and 214 is relatively small, the drying tubes 212 and 214 have a capacity to remove the humidity for multiple on/off cycles of the luminaire 200. In some embodiments the drying tubes 212 and 214 contain enough drying agent to dehumidify 400 on/off cycles of the luminaire 200 before requiring regeneration or replacement of the drying agent by a service technician. The term 'regeneration' refers to a drying treatment that removes absorbed moisture from the drying agent, renewing or regenerating the capacity of the drying agent to continue absorbing moisture. The term 'life' of the drying agent may be used to refer to the time from a first use of the drying agent to the point where its reduced effectiveness as a desiccant requires regeneration or replacement by a service technician. Although the example shown uses two drying tubes 212 and 214, in other embodiments one drying tube (or drying chamber) or more than two drying tubes may be included. Similarly, although some embodiments utilize silica gel as a drying agent, in other embodiments the drying tubes or chambers may additionally or alternatively include other drying agents.

In some embodiments, the hot dry air being forced out when the luminaire 200 is powered on will regenerate the drying agent in the drying tubes, extending the life of the drying agent. In further embodiments, this drying and regeneration process may be enhanced by using a heater (not shown in FIG. 2) inside or around one or both of the drying tubes 212 and 214.

In some embodiments, one or more of the enclosures 202, 204, and 206 may include one or more sensors that are configured to measure characteristics of the enclosure, where the characteristics are selected from, but not limited to, air pressure, air humidity, and/or air temperature. Data samples from such sensors may be collected by a control system of the luminaire 200 and information related to the collected data samples sent (or transmitted) to a user via one or more communication channels such as a display included in the luminaire 200, the wired data link 14 using a protocol such as Remote Device Management (RDM), a web connection via the data link 14, a cellular or WiFi wireless connection, or a near-field communication (NFC) or other wireless communication link. Such sending of the information has the advantage of allowing a user of the luminaire 200 to obtain the information without opening the luminaire 200 or to receive the information at a remote location, rather than being required to access the luminaire 200 to obtain the information. In some embodiments, a plurality of such data samples may be stored in a service log of the luminaire 200 and the contents of the log sent via one or more of the above channels to the user, a service technician, or the manufacturer. Such of a plurality of data samples in a service log has the advantage of giving a historical record of the sensed characteristics within the luminaire. In some such embodiments, the service log may also include a timestamp associated with one or more of the data samples, the timestamp indicating a time at which the data sample was collected and allowing the user, a service technician, or the manufacturer to identify a time at which a data sample of interest was collected.

Additionally, in some such embodiments, the control system of the luminaire 200 may determine, based on data from such sensors, whether the sealed enclosures have been effectively sealed (or re-sealed after maintenance). For example, when the luminaire 200 is powered on if an air pressure sensor indicates that the air pressure inside one or more of the enclosures 202, 204, and 206 is not rising, while at the same time the temperature sensor indicates that the temperature in the enclosure is rising, then this data may be interpreted by the control system as an indication that one or more of the enclosures 202, 204, and 206 are incompletely sealed to the external air. Such a determination provides the advantage of (i) enabling a service technician to determine whether the enclosure(s) have been effectively re-sealed after maintenance, prior to returning the luminaire 200 to service, and/or (ii) enabling a user of the luminaire 200 to determine remotely whether the seals have failed in an enclosure that was previously effectively sealed.

Figure 3:
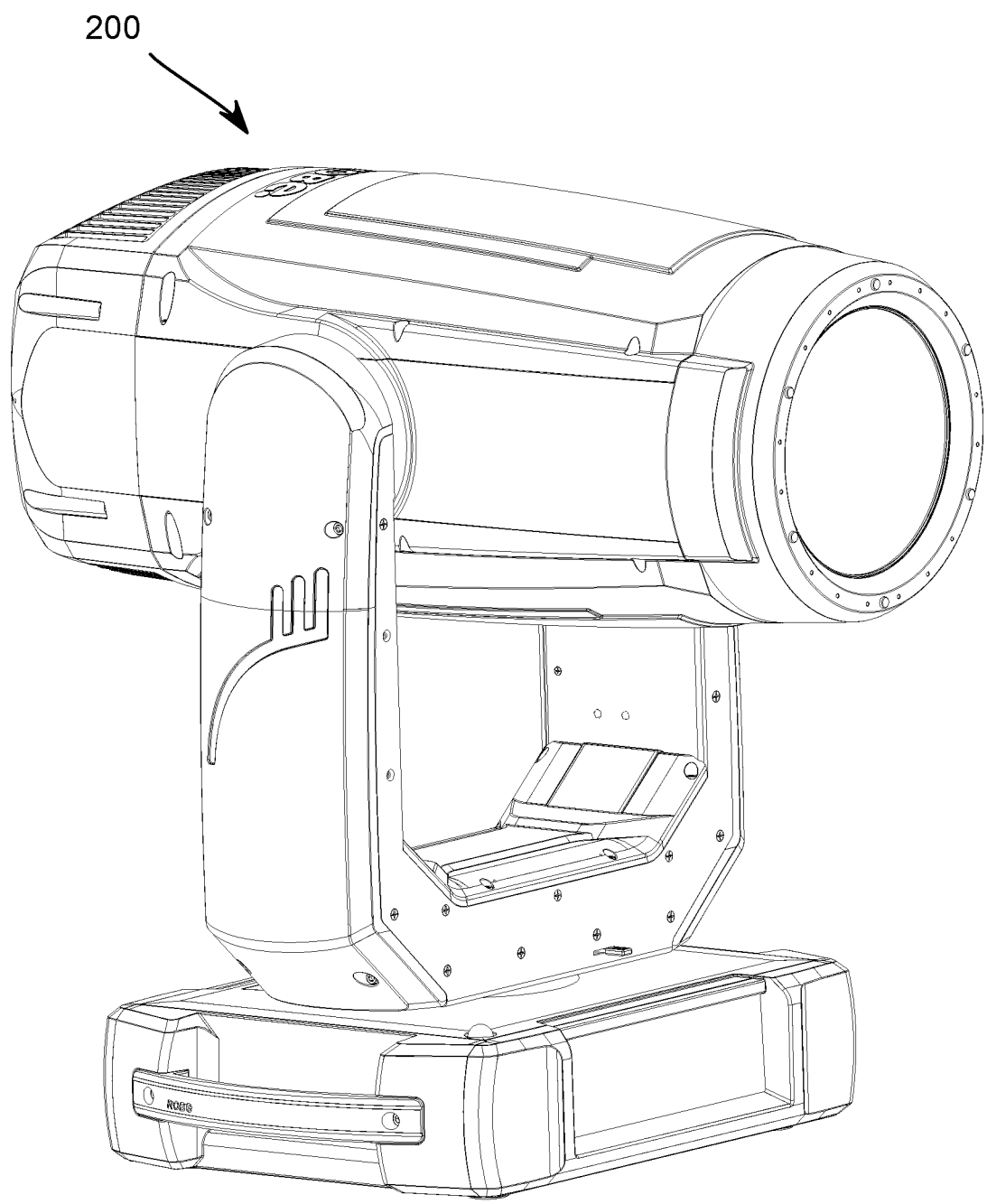
FIG. 3 presents an overview of the luminaire of FIG. 2 in a fully assembled state.

FIG. 3 presents an overview of the luminaire 200 of FIG. 2 in a fully assembled state. The sealed enclosures and associated connecting pipes are hidden in FIG. 3 by external housings or cowls.

Figure 4:
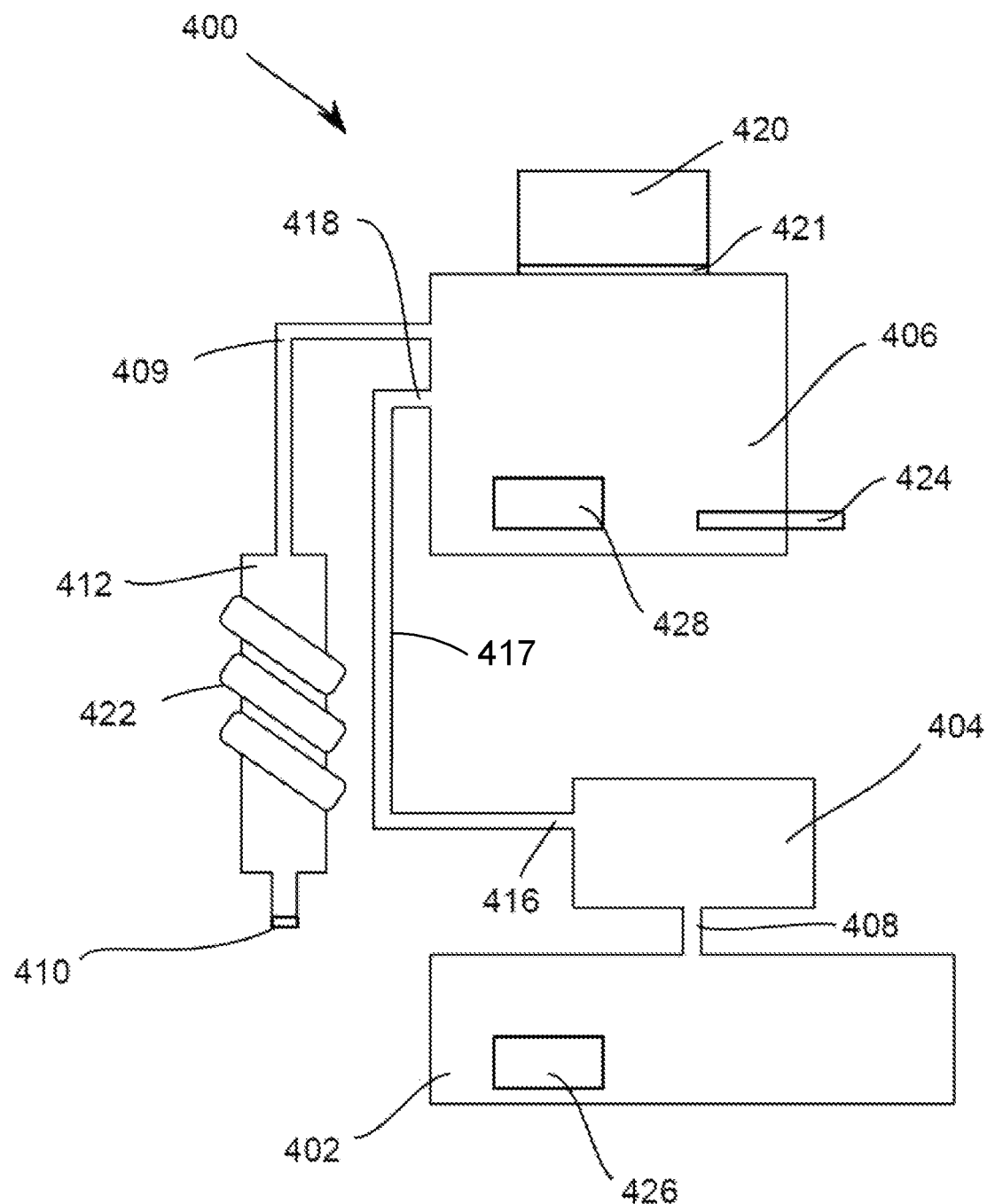
FIG. 4 presents a schematic view of a luminaire humidity and pressure control system according to the disclosure.

FIG. 4 presents a schematic view of a luminaire humidity and pressure control system 400 according to the disclosure. FIG. 4 is a simplified diagrammatic view of the luminaire humidity and pressure control system 400 of the luminaire 200 described with reference to FIG. 2. A base enclosure 402 is vented through a pipe 408 that connects the base enclosure 402 to a motor enclosure 404. In turn, the motor enclosure 404 is vented through a pipe 417 (having ends 416 and 418) that connects the motor enclosure 404 to a head enclosure 406. The three enclosures 402, 404, and 406 are thus connected together with tubing that creates a combined enclosure for pressure and humidity control. The head enclosure 406 is vented through a pipe 409, also venting the enclosures 402 and 404. The pipe 409 enters a drying tube 412, which includes a drying agent such as silica gel. Finally, at an exit of the drying tube 412, a membrane 410 connects the system to the external atmosphere. Membrane 410 may be made of a micro-filter material such as GORE-TEX which allows air to pass through, but reduces or prevents the passage of water or moisture. In the embodiment shown in FIG. 4, a heater 422 is mounted around (or thermally coupled to) the drying tube 412 and may be controlled by a control system of the luminaire 200 to heat the drying agent during the hot-air venting phase of the cycle and/or other desired periods, providing the advantage of regenerating the drying agent and extending its life. In other embodiments, the heater 422 may be mounted inside the drying tube 412. Still other embodiments may not include the heater 422.

The head enclosure 406 includes a sensor 424 that measures one or more parameters such as air pressure, air humidity, or air temperature. In other embodiments, one or more of such sensors 424 may be included in the enclosures 402 and/or 404. In some embodiments, a plurality of such sensors 424 may be included in one or more of the enclosures 402, 404, and 406.

Data samples from such sensors may be collected by the control system of the luminaire 200. The control circuit 426 is located in the base enclosure 402. In other embodiments, a control circuit 428 may be additionally or alternatively located in the head enclosure 406. In still other embodiments, a control circuit (not shown in FIG. 4) may be located in the motor enclosure 404. Such one or more control circuits may separately or cooperatively form the control system for the luminaire 200. Information related to the collected data samples may be sent to a user by the control system via one or more communication channels as described above. As also described above, in various embodiments, the data samples may include a timestamp and may be stored and sent to the user, a service technician, or the manufacturer.

FIG. 4 further shows a light source 420 external to the head enclosure 406. The light source 420 is optically and physically coupled to the head enclosure 406, but separated and sealed from the head enclosure 406 by a transparent window and gasket 421. Heat generated by the light source 420 may be significant, and such an arrangement provides the advantage of keeping heat emanating from the light source 420 external to the head enclosure 406 and helping to reduce the temperature rise and the air pressure rise within the head enclosure 406. Such reductions have the advantage of lessening the volume of air that exits and re-enters the combined enclosure of the three enclosures 402, 404, and 406 during each on/off cycle, helping to increase the life of the drying agent in drying tube 412.

Figure 5:
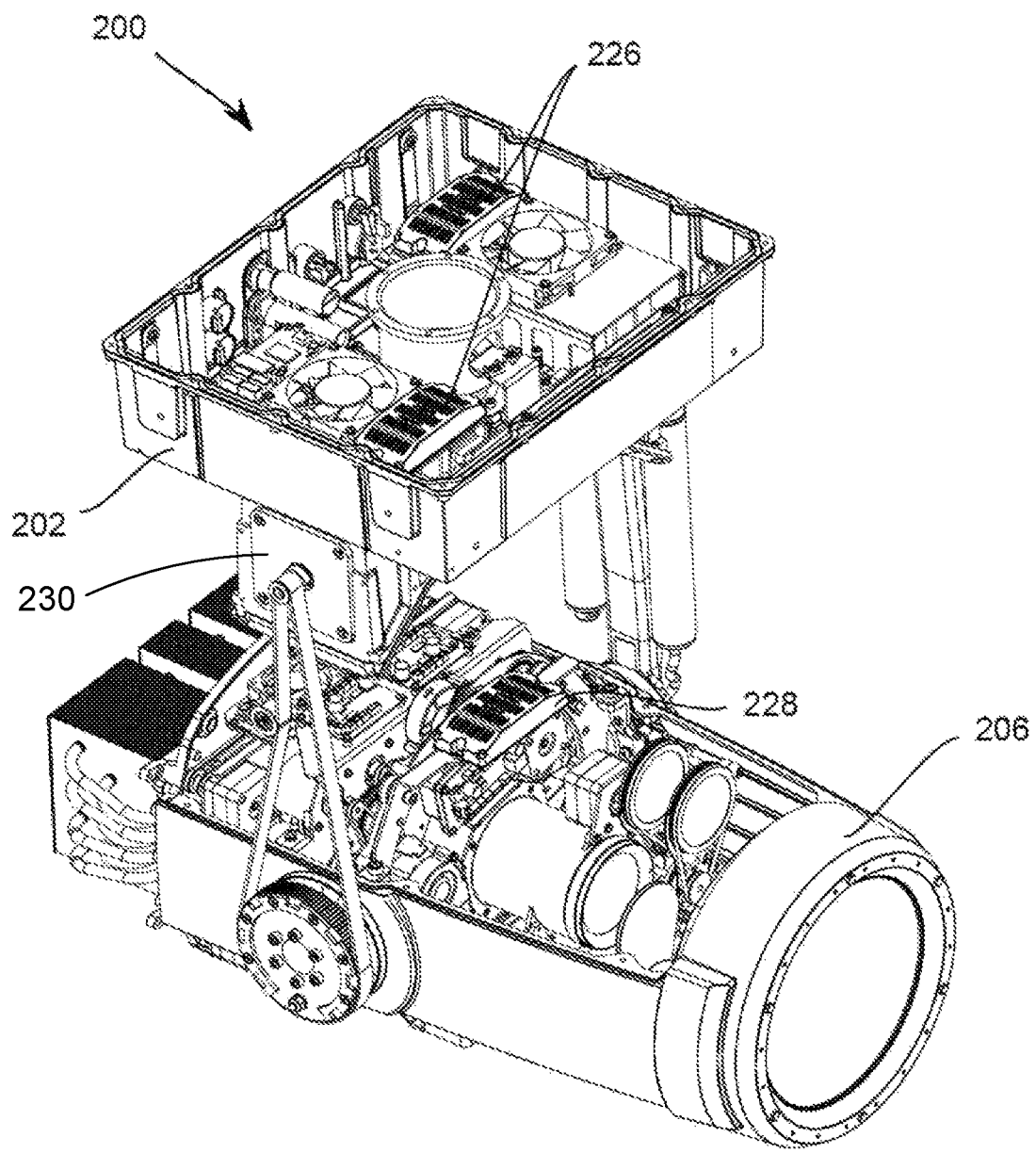
FIG. 5 presents a second view of the luminaire of FIG. 2.

FIG. 5 presents a second view of the luminaire 200 of FIG. 2. The luminaire 200 includes drying boxes 226 in the base enclosure 202 and a drying box 228 in the head enclosure 206. In various embodiments, zero or more drying boxes may be included in any enclosure of a luminaire humidity and pressure control system according to the disclosure.

The drying boxes 226 and 228 are not part of the air cycle path described with reference to FIG. 2, which occurs when the luminaire 200 heats up and cools down. Instead the drying boxes 226 and 228 aid in initial assembly and subsequent maintenance. When the luminaire 200 is manufactured and the enclosures 202, 204, and 206 are first sealed, they will contain the air from the factory, which may be humid. The drying boxes 226 and 228 include a drying agent such as silica gel and a plurality of openings in the box that expose the drying agent to the air in the enclosure. Once the enclosure is sealed, such boxes will remove some of the initial humidity captured within the enclosure, even before the luminaire is powered. The drying boxes 226 and 228 may also help ensure that air in the enclosures remain dry during storage and shipping.

In some embodiments, the drying agent inside any of the drying boxes 226 and 228 and/or the drying tubes 212 and 214 changes color when it absorbs moisture. In some such embodiments, the drying boxes 226 and 228 and/or the drying tubes 212 and 214 are configured to allow such color-changing drying agent to be easily visible. In some such embodiments, the drying boxes 226 and 228 and/or the drying tubes 212 and 214 may be fabricated at least in part of a transparent or translucent material. In other such embodiments, the drying box or drying tube may have an easy to remove portion of the box or tube exposing the drying agent to view. In still other embodiments, one or more of the plurality of openings in the drying box may be sized to allow viewing of the drying agent through the opening. Such a drying agent and drying boxes or drying tubes provide the advantage of enabling a user or service technician to visually check whether the drying agent is ready for use or needs regeneration or replacement before sealing the enclosures 202, 204, and 206 of the luminaire 200.

The inclusion of the drying boxes 226 and 228 provides the advantage of an extra, initial drying cycle, which may serve to extend the life of the drying agents in the drying tubes within the luminaire. The inclusion of the drying boxes 226 and 228 provides the advantage of allowing the luminaire 200 to be placed back into service more quickly, without requiring the use of external tools to dehumidify the sealed enclosure or to flush the humid air from the sealed enclosure with nitrogen or dehumidified air.

Figure 6:
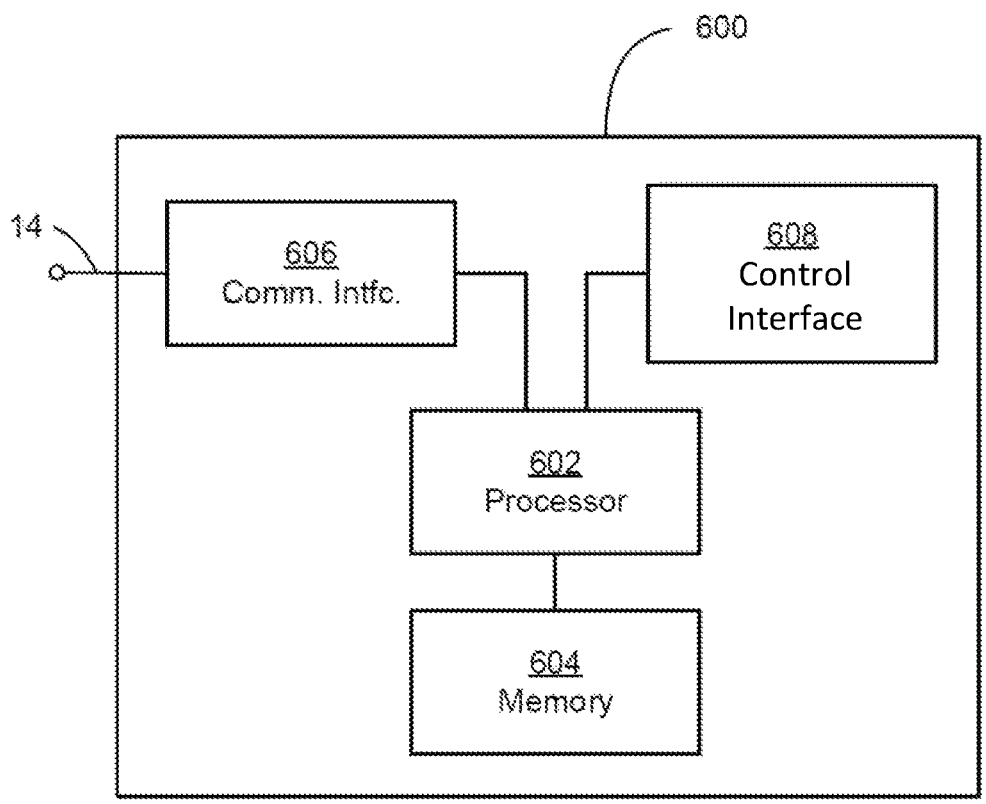
FIG. 6 presents a block diagram of a control system according to the disclosure.

FIG. 6 presents a block diagram of a control system (or controller) 600 according to the disclosure. The control system 600 is suitable for use to control the systems of a luminaire comprising a luminaire humidity and pressure control system according to the disclosure. The control system 600 is also suitable for controlling the light source, optical devices, pan and/or tilt systems, and other control functions of the luminaires 12 and 200 as well as connecting and responding to and storing data read from sensors installed within the luminaires 12 and 200.

The control system 600 includes a processor 602 electrically coupled to a memory 604. The processor 602 is implemented by hardware and software. The processor 602 may be implemented as one or more Central Processing Unit (CPU) chips, cores (e.g., as a multi-core processor), field-programmable gate arrays (FPGAs), application specific integrated circuits (ASICs), and digital signal processors (DSPs).

The processor 602 is further electrically coupled to and in communication with a communication interface 606. The communication interface 606 is coupled to, and configured to communicate via, the data link 14. The processor 602 is also coupled via a control interface 608 to one or more sensors 424, motors, actuators, controls, heater 422, and/or other devices. The processor 602 is configured to receive control signals from the data link 14 via the communication interface 606 and, in response, to control systems and mechanisms of the luminaire 12 via the control interface 608.

Via the control interface 608, the processor 602 is further electrically coupled to and in communication with temperature, humidity, and/or pressure sensors such as the sensor 424. The processor 602 is configured to receive control signals from the data link 14 via the communication interface 606 and, in response, measure, store, and transmit information related to data sampled from one or more of the sensors 424.

The control system 600 is suitable for implementing processes, module control, optical device control, pan and tilt movement, parameter control, motor control, position sensor control, brake control, and other functionality as disclosed herein, which may be implemented as instructions stored in the memory 604 and executed by the processor 602. The memory 604 comprises one or more disks and/or solid-state drives and may be used to store instructions and data that are read and written during program execution. The memory 604 may be volatile and/or non-volatile and may be read-only memory (ROM), random access memory (RAM), ternary content-addressable memory (TCAM), and/or static random-access memory (SRAM).

While only some embodiments of the disclosure have been described herein, those skilled in the art, having benefit of this disclosure, will appreciate that other embodiments may be devised which do not depart from the scope of the disclosure herein. While the disclosure has been described in detail, it should be understood that various changes, substitutions, and alterations can be made hereto without departing from the spirit and scope of the disclosure.

What is claimed is:

1. A luminaire, comprising:
an enclosure comprising one or more luminaire components configured to modify and emit a light beam, the enclosure including a first opening and being otherwise sealed from external air; and
a chamber comprising a drying agent and second and third openings and being otherwise sealed from the external air, wherein:
the chamber is coupled at the second opening by a sealed air coupling to the enclosure at the first opening;
the third opening comprises a membrane completely covering the third opening, the membrane comprising a material configured to allow air to pass through the material while reducing the passage of water droplets in the air; and
the chamber is configured such that reduced air pressure in the enclosure at the second opening draws air into the chamber via the third opening.

2. The luminaire of claim 1, wherein the sealed air coupling is a rotatable sealed air coupling.

3. The luminaire of claim 1, wherein the chamber is configured to cause air passing between the second and third openings to pass through the drying agent.

4. The luminaire of claim 1, wherein:
the enclosure comprises one or more sensors configured to measure characteristics of the enclosure, the characteristics including one or more of air pressure, air humidity, and/or air temperature; and
the luminaire further comprises a control system electrically coupled to the one or more sensors and configured to collect data from the one or more sensors and to send information related to the collected data to a user of the luminaire via a communication channel.

5. The luminaire of claim 4, wherein the control system is further configured to determine, based on the collected data from the one or more sensors, whether the enclosure has been effectively sealed.

6. The luminaire of claim 4, wherein the communication channel comprises at least one of a display, a wired data link, and a wireless communication link.

7. The luminaire of claim 4, wherein the information related to the collected data comprises a plurality of data samples collected from the one or more sensors by the control system.

8. The luminaire of claim 7, wherein the information related to the collected data further comprises a timestamp associated with one or more of the plurality of data samples.

9. The luminaire of claim 1, further comprising a light source located external to the enclosure and optically coupled to one or more of the luminaire components of the enclosure.

10. The luminaire of claim 1, further comprising:
a heater thermally coupled to the drying agent of the chamber; and
a control system electrically coupled to the heater and configured to controllably heat the drying agent during desired periods of operation of the luminaire.

11. The luminaire of claim 1, wherein the drying agent in the chamber comprises silica gel.

12. The luminaire of claim 1, wherein the membrane comprises a hydrophobic membrane material.

13. The luminaire of claim 1, wherein the drying agent in the chamber changes color when it absorbs moisture and the chamber is fabricated at least in part of a transparent or translucent material.

14. The luminaire of claim 1, wherein the enclosure further comprises a drying box, the drying box comprising a second drying agent and a plurality of openings configured to expose the drying agent to air in the enclosure.

15. The luminaire of claim 14, wherein the drying agent in the drying box changes color when it absorbs moisture and the drying box is fabricated at least in part of a transparent or translucent material.

16. A luminaire, comprising:
- a first enclosure comprising one or more luminaire components configured to modify and emit a light beam, the first enclosure including first and second openings and being otherwise sealed from external air;
- a second enclosure comprising electronic circuits electrically coupled to the luminaire components of the first enclosure, the second enclosure including a third opening and being otherwise sealed from the external air, wherein the first enclosure is rotatably mounted to the second enclosure and the first opening is air coupled to the third opening by a first rotatable sealed air coupling; and
- a chamber comprising a drying agent and fourth and fifth openings and being otherwise sealed from the external air, wherein:
  - the chamber is coupled at the fourth opening by a sealed air coupling to the first enclosure at the second opening; and
  - the fifth opening comprises a membrane completely covering the fifth opening, the membrane comprising a material configured to allow air to pass through the material while reducing the passage of water droplets in the air.

17. The luminaire of claim 16, further comprising a third enclosure, wherein the first enclosure is rotatably mounted to the third enclosure and the third enclosure is rotatably mounted to the second enclosure, whereby the first enclosure is rotatably mounted to the second enclosure by the third enclosure, the third enclosure comprising:
- sixth and seventh openings and being otherwise sealed from the external air, wherein:
  - the sixth opening is air coupled to the first opening by a second rotatable sealed air coupling; and
  - the seventh opening is air coupled to the third opening by a third rotatable sealed air coupling.

18. The luminaire of claim 16, wherein:
- at least one of the first enclosure and the second enclosure comprises one or more sensors configured to measure characteristics of the at least one enclosure, the characteristics including one or more of air pressure, air humidity, and/or air temperature; and
- the luminaire further comprises a control system electrically coupled to the one or more sensors and configured to collect data from the one or more sensors and to send information related to the collected data to a user of the luminaire via a communication channel.

19. The luminaire of claim 16, further comprising:
- a heater thermally coupled to the drying agent of the chamber; and
- a control system electrically coupled to the heater and configured to controllably heat the drying agent during desired periods of operation of the luminaire.

20. The luminaire of claim 16, wherein the membrane comprises a hydrophobic membrane material.

* * * * *